Oct. 11, 1966 C. G. McDONOUGH 3,278,875
ROTARY SOLENOID
Filed Dec. 30, 1963 3 Sheets-Sheet 1

Inventor
Cletus G. McDonough
By John Todd
Attorney

Oct. 11, 1966   C. G. McDONOUGH   3,278,875
ROTARY SOLENOID
Filed Dec. 30, 1963
3 Sheets-Sheet 2
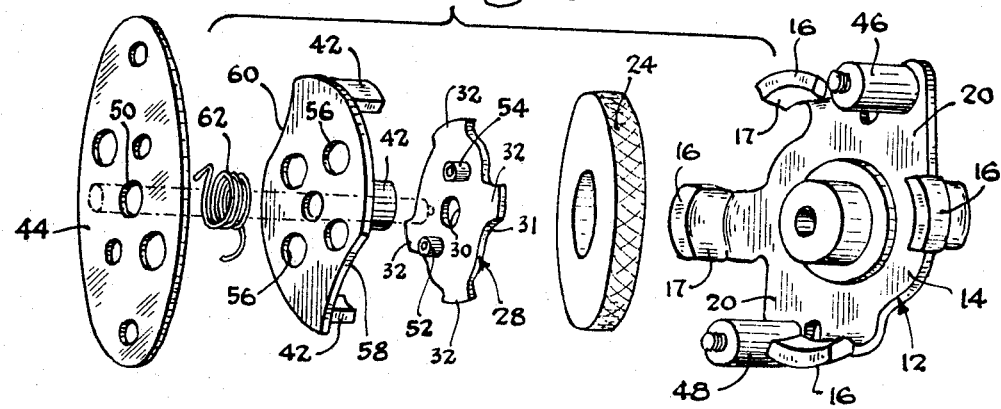
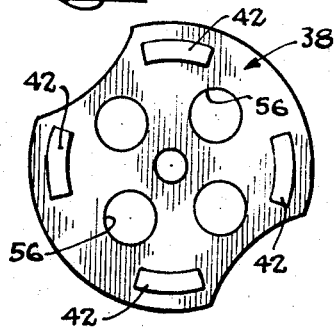
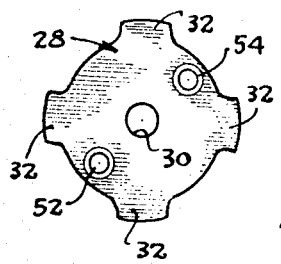
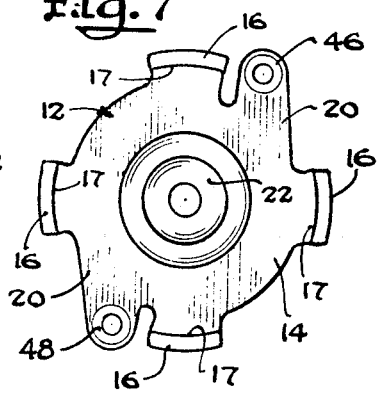
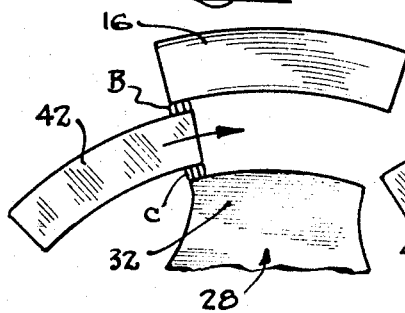
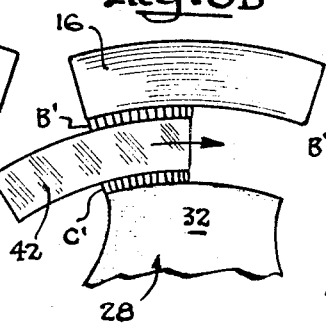
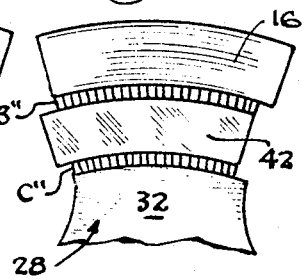
Inventor
Cletus G. McDonough
By John Jodd
Attorney

United States Patent Office 3,278,875
Patented Oct. 11, 1966

3,278,875
ROTARY SOLENOID
Cletus G. McDonough, Elmhurst, Ill., assignor to United-Carr Incorporated, a corporation of Delaware
Filed Dec. 30, 1963, Ser. No. 334,184
1 Claim. (Cl. 335—272)

The present invention relates to an improved solenoid and more particularly it relates to an improved construction for a rotary solenoid.

Various forms of solenoid construction have been provided to convert the solenoid action into rotary mechanical output. One such form involves the use of a plunger-type solenoid with the plunger being operatively mounted to move axially into and out of the solenoid coil upon operation. The axial movement of the plunger into the coil is converted to rotary motion on an output shaft by a bearing and inclined plane assembly which cause the plunger to rotate as it moves axially in much the same fashion as a worm drive or in screw-like configuration. Another form involves the use of a rotary solenoid having a decreasing air gap between the rotor and operatively associated pole faces. This type of solenoid construction provides an increase in the torque with angular displacement and with movement of the rotor into aligned relation with its mating pole face, the increase in torque being in direct relation to the degree of alignment with the mating pole. With this latter type of solenoid construction the torque component is smallest at the start of angular motion and increases as the rotor approaches the end of its predetermined angular displacement. The result generally is that a high impact force is realized when the rotor moves against a physical stop at the completion of its rotary motion which impact gives rise to increase wear rates and to noisy operation of the unit.

The present invention is directed to the provision of an improved rotary solenoid operation that does not involve a plunger-type construction with attendant need for conversion of the plunger action to rotary action and that provides maximum torque at the start of rotary motion to overcome the inertial forces acting upon the rotor and reducing the torque in substantially linear relation during angular travel of the rotor into aligned relation with its mating pole. The present improved solenoid construction thereby provides for substantially constant acceleration of the rotor through its path of travel and avoids the high impact forces attendant upon termination of movement of the rotor.

It, accordingly, is a general object of the present invention to provide an improved rotary solenoid.

Another object of the present invention resides in the provision of an improved rotary solenoid adapted to deliver a high torque component to move the rotor during initiation of rotary movement and wherein a decreasing torque acts upon the rotor after initiation of motion and during rotary movement thereof to thereby provide substantially linear acceleration during travel of the rotor.

A further object of the present invention is to provide an improved rotary solenoid construction adapted to decrease the torque component acting upon the rotor as the rotor moves into alignment with the mating pole face to thereby reduce impact force upon termination of movement of the rotor.

An additional object of the present invention is to provide an improved rotary solenoid construction wherein a fixed armature and stator magnetic flux path is defined to eliminate losses associated with pivoted or sliding armature or stator members.

Still another object of the present invention resides in the provision of an improved rotary solenoid that is economical to manufacture, easy to install and use, that is durable for continued frequent use and that provides quiet operation.

The novel features which are believed to be characteristic of the invention are set forth with particularity in the appended claims. The invention itself, however, together with further objects and advantages thereof, will best be understood by reference to the following description taken in connection with the accompanying drawings, in which:

FIGURE 4 is an exploded view of the solenoid of FIGURE 1;

FIGURE 5 is a bottom plan view of the rotor plate of the solenoid of the present invention;

FIGURE 6 is a plan view of the armature plate of the solenoid;

FIGURE 7 is a top plan view of the stator plate of the solenoid of the present invention;

Figure 9:
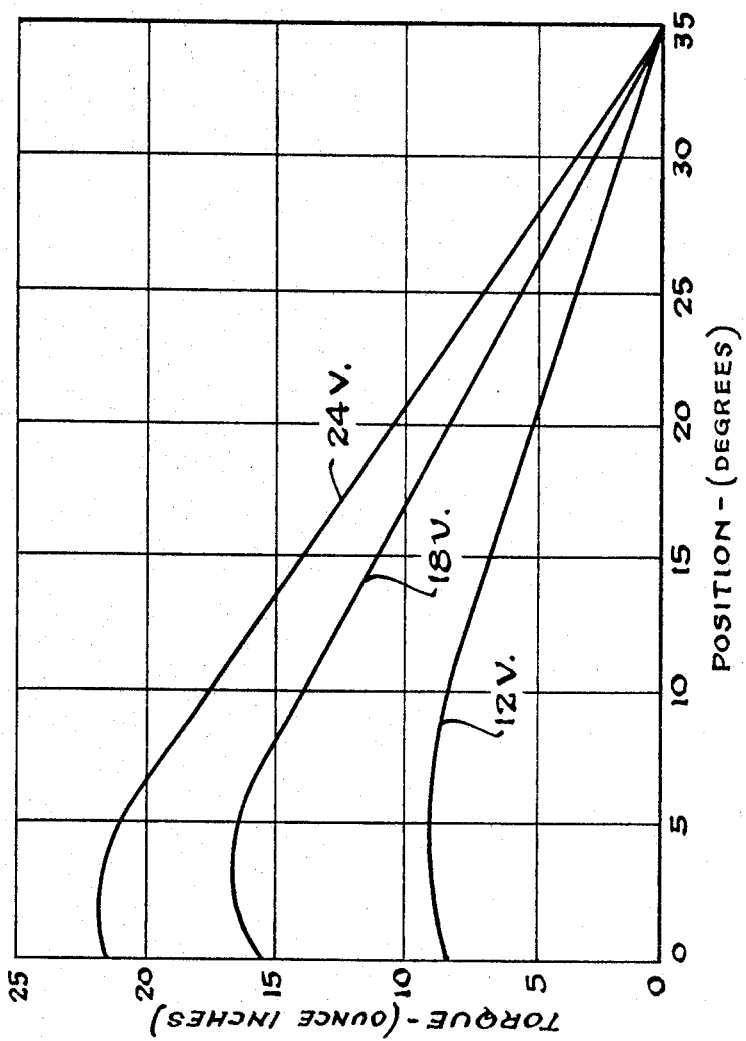

FIGURES 8A, 8B and 8C are schematic representations illustrating movement of the magnetically permeable members of the rotor plate into alignment with the pole members of the solenoid; and FIGURE 9 is a graphic illustration of the torque characteristics of the solenoid of the present invention showing the substantially linear reduction in torque as the rotor extends into alignment with the poles off the solenoid during rotory movement of said rotor member.

Figure 1:
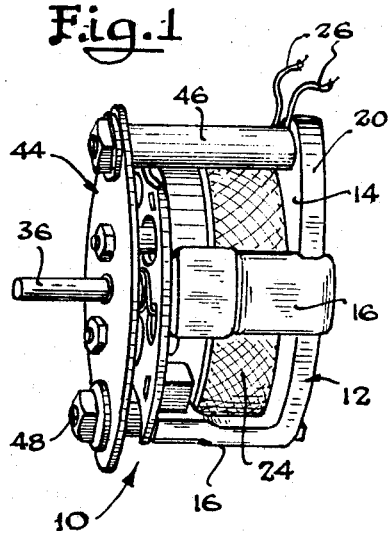
FIGURE 1 is a view, in perspective, of the solenoid of the present invention.

Referring more particularly now to the drawings and specifically to FIGURE 1 thereof the improved rotary solenoid of the present invention is indicated generally at 10. The solenoid 10 includes a stator 12 which stator comprises a main body portion 14 and a plurality of upstanding legs 16 disposed at spaced intervals about the periphery of the main body portion 14 of the stator. The legs 16 define pole members and are formed substantially at right angles to the main body portion of the stator terminating at a predetermined spaced interval above said plate, as seen more clearly on FIGURE 2. The inner faces 17 of each of the poles 16 is generally curvilinear and the faces of each pole lie in a common base circle 18. The base portion 14 of the stator 12 includes radial extensions 20 in diametrically opposed positions thereon.

A core 22 is affixed to the base portion 14 of the stator 12. The core may be affixed to the stator by bolting it thereto, welding, or other suitable means to provide a rigid attachment between the two members. The upper terminal of the core 22 includes an annular shoulder portion 23 defined at the intersection between the upstanding extension 23a and the main upper terminal portion 23b.

A coil 24 having a predetermined number of windings for optimum operability in service is disposed about the core 22 in axially aligned relation therewith. The coil is spaced between the outer periphery of the core 22 and the inner faces 17 of the stator poles 16. As seen in FIGURE 1, electrical leads 26 extend from the coil and are adapted to be connected to an external source of electrical power (not shown). The coil, when energized from a suitable power source, sets up a magnetic field. The magnetically permeable core is included, of course, to act as a collector for the magnetic flux and to concentrate this flux so that the flux intensity in the magnetic circuit is substantially higher than the intensity which would be characteristic of the coil above.

Figure 3:
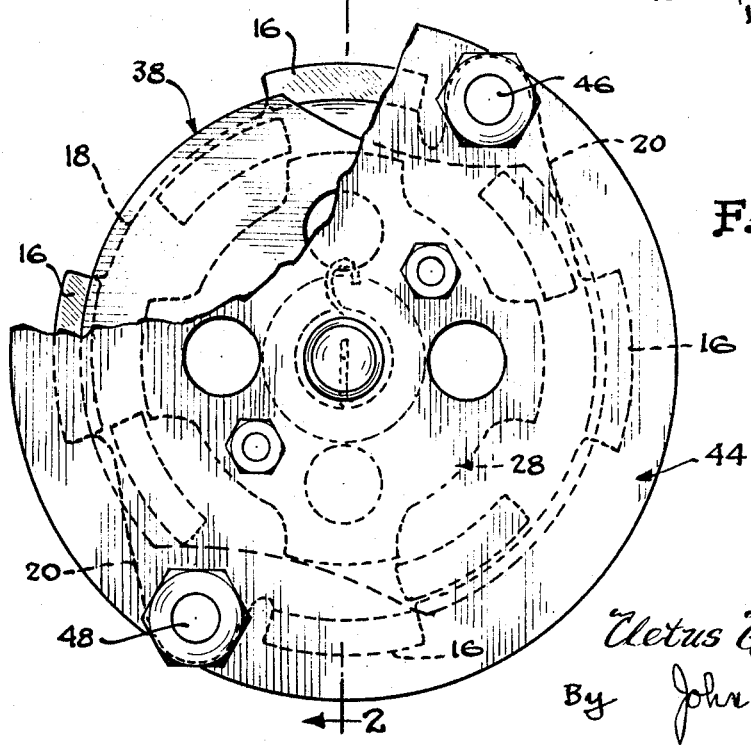
FIGURE 3 is a top plan view, partly broken away, of the solenoid as illustrated in FIGURE 2 of the drawings.

The armature 28 is affixed to the upper terminal portion of the core 22. The armature 28 defines a central opening 30 which is received in squeeze fit over the extension 23a of the upper terminal of said core 22. The lower face 31 of the armature 28 adjacent the central openings 30 thereof rests upon the portion 23b of the core 22. The armature may be attached to the core, if necessary, by any suitable fastening means, the squeeze fit noted hereinabove (with non-circular members) generally being sufficient to assure non-rotatable relation between the armature and the core member and to assure provision of a completed path therebetween for the magnetic field generated by the current passing through the coil 24. As seen more clearly in FIGURES 3, 4 and 6, the armature 28 is provided with a plurality of poles 32, disposed at spaced intervals about the periphery thereof. The poles 32 are in radially aligned relation with the poles 16 of the stator when the armature and stator are in assembled relation on the solenoid, as seen in FIGURE 3 of the drawings.

Figure 2:
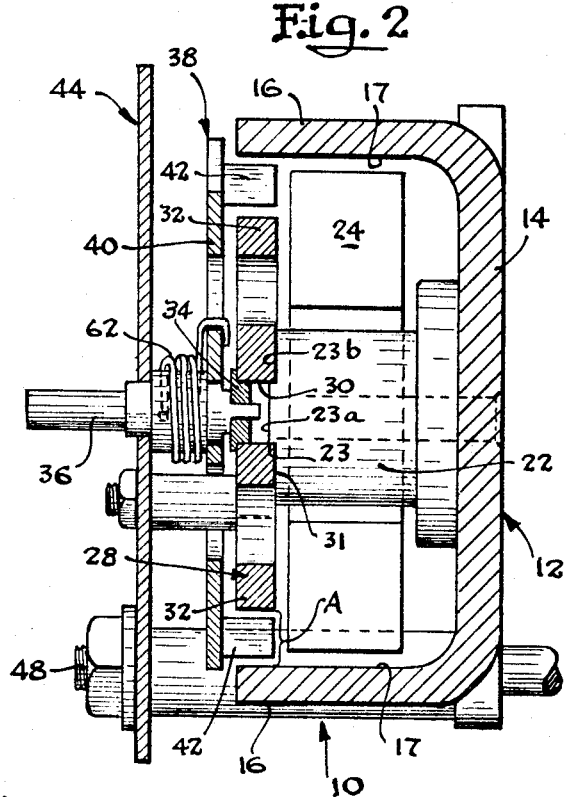
FIGURE 2 is an enlarged side elevation, partly in section, of the solenoid of FIGURE 1, illustrating details of construction.

A bushing 34 is inserted into the opening 31 of the armature 28, as seen in FIGURE 2. One terminal of the output shaft 36 is supported by the bushing 34, said shaft 36 thereby being rotatably supported with respect to the armature 28.

A rotor 38 is non-rotatably secured to the output shaft 36 such that the rotor when in assembled relation on said shaft is axially spaced from the armature 28. The main body portion 40 of the rotor 38 is of a non-magnetizable material. A plurality of magnetically permeable members 42 are affixed to the main body portion 40 of the rotor 38 at spaced intervals thereabout. The members 42 generally are equal in width to the curvilinear distance defined in the space A between the stator and armature poles 16 and 32, respectively. The faces of the members 42 are generally curvilinear and are spaced from the facing stator and armature poles when in registration therewith in the space A defined between said poles.

A bearing plate 44 is supported on posts 46 and 48 which, in turn, are affixed to extensions 20 of the stator 12. The extension of the outlet shaft 36 is received through the opening 50 of the plate 44 and is supported for rotary movement with respect thereto by a bearing, bushing or other similar means.

A pair of stop bars 52 and 54 are affixed to the upper face of the armature 28 and extend one each through the mating opening 56 of the rotor member 38 of the assembly. The openings 56 are sufficiently large in diameter to permit full movement of the rotor during operation from a position wherein the magnetically permeable members 42 mounted on said rotor are in minimum registration with the poles 16 and 32 to a second position where they are fully in registration with said poles and extend into the space A defined therebetween. It can readily be seen that the periphery of the openings 56 will be in abutting engagement with the outer surface of the stop bars 52 and 54 when the rotor is in said first or second position, noted above. The range of angular movement of the rotor may be varied by varying the diameter of the stop bars 52 and 54, by varying the diameter of the openings 56 within which the bars 52 and 54 are received or by any combination of the above. The larger bar or smaller opening 56 per se, of course, serving to limit the angular movement of the rotor.

The rotor 38 defines a pair of diametrically opposed recesses 58 and 60. The recesses 58 and 60 define the portions of said rotor 38 which are received adjacent the posts 46 and 48 of the stator assembly. Said recesses extend partially about the periphery of the rotor 38 to provide means for free angular rotation thereof without moving against either of the posts 46 or 48 of the solenoid assembly.

A return spring 62 is coiled about the output shaft 36 of the assembly in the area thereof between the bearing plate 44 and the upper face of the rotor 38. One end of the coiled spring is affixed against a stop bar 52 to define a fixed reference therefor, the other end thereof being affixed to the rotor 38. When the rotor 38 is moved angularly so that the magnetically permeable members 42 extend into the spacings A of the assembly the spring will be in a flexed, unstable condition. The spring will act upon the rotor with a force less than the magnetic force acting to hold the rotor in position with the members 42 in spaces A but of sufficient magnitude so that when the power to the coil 24 is terminated the spring will return the rotor 38 to a first position with the members 42 spaced from registration with the poles 16 and 32 of the stator and armature, respectively. The spring exerts the reset action upon the rotor 38 to ready the solenoid for the next operation.

The solenoid assembly is operated by first energizing the coil 24 from a power supply source (not shown) to generate a magnetic field about the coil. The magnetic flux lines will define a path through the core 22 of the assembly, base 14 of the stator and then to the poles 16 of said stator through the spaces A defined between the poles 16 of the stator and 32 of the armature 28, to the poles 32 to armature 28 and thence returning to the core 22 of the solenoid assembly. When the solenoid is operated under given voltage and current conditions, it should be observed that the magnetic flux density will remain at an essentially constant density because the gap defined by the spaces A between stator and armature poles remains constant. The permeable members 42 of the rotor are initially partially introduced into the spacings A defining the air gap between stator and armature poles and defines a true rotary or circular path because the flux concentration across the shorter air gaps B and C defined between the member 42 and the mating adjacent faces of the poles 16 and 32, respectively, establishes a magnetic attractive force acting upon said members 42. This force, or torque action is greatest at the initiation of introduction of the members 42 into the gaps A and decreases as the flux path cross-section area increases (as at B'–C' and at B"–C") as said members 42 rotate into fuller registration with the mating faces of the poles 16 and 32.

The torque acting upon the members 42 to move them into registration with the poles of the assembly may be determined by the following formula:

$$T = KFa^2 \frac{dPa}{d\theta}$$

where:

$K$=Unit proportionality constant;
$T$=Torque acting upon members 42;
$Fa$=Magnetomotive force across the gaps A for related portions of members 42;

$\frac{dPa}{d\theta}$=Rate of change of permeance upon movement of rotor.

The mathematical representation noted indicates that the torque component of the device will have a repeatable characteristic where a constant input signal is impressed upon the coil 24 of the solenoid assembly. This characteristic in part follows due to the improved construction and operation of the solenoid assembly. The magnetically permeable members 42 of the rotor 40 move into the spacing A between the poles 16 and 32 of the stator and armature, respectively, with uniform spacing defined between the adjacent, mating faces thereof for all angular positions of the rotor so that the air gap is constantly decreasing as the members 42 move into fuller registration with the poles. The magnetic flux lines find an easier path in passing through the increasing area of the magnetically permeable members 42 in passing through the gaps A defined between the poles 16 and 32.

The graphic illustration of FIGURE 9 of the drawings illustrates the progressively decreasing torque component acting upon the members 42 for increasing angular rotation of the rotor 38. As seen the initial torque for the illustration wherein a 12 volt signal is applied to the coil is about 7 ounce-inches in a model actually constructed and tested, the torque being measured with conventional torque measuring equipment on the output shaft 36 of the solenoid assembly. The above noted torque remains at substantially the same level for the first 10 degrees of rotor angular movement during which time the members 42 are first introduced into the gaps A of the assembly noted in the drawings in FIGURE 8A. After introduction of the member 42 into the gaps A the torque component acting upon the rotor 38 through the members 42 decreases in substantially linear fashion as indicated in the graphic illustration for rotor positions from 10 degrees to 35 degrees dropping substantially to zero-ounce-inches when the rotor is moved angularly until members 42 are in full registration with the mating pole members (a movement of 35 degrees in this illustration). The same characteristic appears for other signal conditions as illustrated in greater detail on the graphic representation for an 18 volt signal upon the coil 24 and a 24 volt signal upon coil 24. It should be observed that in other solenoid assemblies of the rotary type presently available the torque acting upon the movable member of the solenoid starts at about the same or slightly lower level as that illustrated in FIGURE 9 and progressively increases as the rotor moves into registration with the poles of said solenoids. This is partially due to the fact that only one pole is employed with the magnetic path being completed through a swinging or rotating solenoid arm or to the fact that the angular path of the rotating solenoid arm converges with the pole member of the solenoid to cause them to abut when the rotor or arm is to be stopped.

While a specific embodiment of the present invention is shown and described it will, of course, be understood that other modifications and alternative constructions may be used without departing from the true spirit and scope of the invention. It is intended by the appended claim to cover all such modifications and alternative constructions as fall within their true spirit and scope.

What I claim as new and desire to secure by Letters Patent of the United States is:

An improved rotary solenoid with substantially linear rotor acceleration characteristics during travel of the rotor, comprising:

- a stator having pairs of oppositely disposed uniformly circumferentially spaced pole elements thereon and lying within a common circle, each said pole element having an arcuate inner face defining a segment of a first common base circle;
- a core affixed to said stator with the outer periphery thereof being equally radially distant from each radially aligned pole;
- an armature affixed to said core and having a plurality of pole elements equal in number to the pole elements of the stator, one of said armature pole elements being in spaced radially aligned relation with each pole element of the stator, the outer terminals of each of said armature pole elements having an arcuate face and defining segments of a second common base circle of smaller diameter than the diameter of said first common base circle and defining radially constant air gaps between the aligned stator and armature pole elements;
- an electrically energizable coil mounted on said core;
- an output shaft rotatably supported by the armature; and,
- a rotor of non-magnetic material non-rotatably mounted on said output shaft and having a plurality of circumferentially spaced apart magnetically permeable members affixed thereto, said permeable members in one position extending fully into the air gap between the aligned stator and armature pole elements and in another position being circumferentially withdrawn from said air gap, said magnetically permeable members extending axially of the armature and stator pole elements for a distance at least equal to the thickness of the armature pole elements, said permeable elements moveable into and out of the air gap and defining a magnetic flux path upon moving into said air gap to provide a high initial torque component moving said permeable elements further into said flux path during initial movement of said permeable elements into the air gap and a constantly decreasing torque component during continued movement of said permeable elements into said air gap to provide substantially linear acceleration of said rotor thereby avoiding high impact forces upon positive stopping of the rotor.

References Cited by the Examiner

UNITED STATES PATENTS

| 2,449,901 | 9/1948 | Kaiser | 317—197 X |
| 3,001,107 | 9/1961 | Rhodes | 317—197 X |

FOREIGN PATENTS

| 102,130 | 8/1962 | Netherlands. |

BERNARD A. GILHEANY, *Primary Examiner.*

G. HARRIS, JR., *Assistant Examiner.*